United States Patent [19]

Tugukuni et al.

[11] 4,122,055
[45] Oct. 24, 1978

[54] AQUEOUS DISPERSION TYPE THERMOSETTING COATING COMPOSITION

[75] Inventors: Hideyoshi Tugukuni, Izumi; Masafumi Kano, Nagaokakyo; Yoshihiko Nishimura, Toyonaka, all of Japan

[73] Assignee: Dai Nippon Toryo Co., Ltd., Japan

[21] Appl. No.: 751,077

[22] Filed: Dec. 16, 1976

[30] Foreign Application Priority Data

Dec. 26, 1975 [JP] Japan .............................. 50-155965
Mar. 3, 1976 [JP] Japan .................................. 51-22906
Mar. 6, 1976 [JP] Japan .................................. 51-24526

[51] Int. Cl.$^2$ ........................ C08L 61/28; C08L 63/00
[52] U.S. Cl. .................... 260/29.4 UA; 260/29.2 EP; 260/29.2 TN; 260/29.4 R; 260/29.6 NR; 260/29.6 MN; 428/418; 428/458; 428/460; 428/500
[58] Field of Search .................. 260/29.6 NR, 29.2 E, 260/29.6 WB, 29.2 TN, 29.2 EP, 29.4 UA, 29.4 R, 29.6 MN; 427/195, 212

[56] References Cited

U.S. PATENT DOCUMENTS

| 3,002,940 | 10/1961 | Holloway | 260/29.6 WB |
| 3,170,888 | 2/1965 | Kutik et al. | 260/29.6WB |
| 3,657,175 | 4/1972 | Zimmermann | 260/29.4 UA |
| 3,687,885 | 8/1972 | Abriss et al. | 260/29.6 WB |
| 3,738,991 | 6/1973 | Reed | 260/29.6 RW |
| 3,907,737 | 9/1975 | Marx et al. | 260/29.6 NR |
| 3,992,478 | 11/1976 | Kamosaki | 260/29.6 NR |
| 4,022,737 | 5/1977 | Sekmakas et al. | 260/29.4 UA |

*Primary Examiner*—Theodore E. Pertilla
*Attorney, Agent, or Firm*—Bucknam and Archer

[57] ABSTRACT

The present invention relates to an aqueous dispersion type thermosetting coating composition consisting essentially of a homogeneous mixture of an aqueous medium, a powder of a thermosetting resin having an acid value of 5 to 30, a carboxyl group-containing organic polymeric thickener, and an organic amine and/or an alkali metal hydroxide.

11 Claims, No Drawings

AQUEOUS DISPERSION TYPE THERMOSETTING COATING COMPOSITION

DESCRIPTION OF THE PRIOR ART

Recently, development of paints and coating methods causing no environmental pollution has been desired, and the use of powdery paints and aqueous paints has been expanding steadily. These paints have important characteristics and merits, but they include various defects and disadvantages as well.

More specifically, the use of powdery paints involves various difficulties. For example, special coating equipment must be used for performing the coating operation using powdery paints, and hence, the adaptability of powdery paints to the coating operation is much lower than that of conventional solvent type paints. Moreover, coatings formed from these powdery paints are inferior in smoothness and appearance, and it is difficult to form thin films having a thickness smaller than $50\mu$.

In aqueous paints of water-soluble type, since it is impossible to form the paint having high-solid concentration, it is impossible to form a thick coating by one coating operation. Further, because of the presence of a number of hydrophilic groups introduced to render the base resin water-soluble, the durability of the resulting coatings is very bad. In aqueous emulsion paints, since surface active agents are used in large quantities, the resulting coatings are insufficient in water resistance, chemical resistance and the like.

As paints overcoming these defects and disadvantages, there have been developed slurry paints (aqueous dispersion type paints) which are formed by suspending a powdery resin in water and are used in the same manner as aqueous paints.

Paints of this type comprise an aqueous medium and a particulate resin having a size of about 0.5 to about $80\mu$, which is dispersed in the aqueous medium at a solid concentration of 20 to 70% by weight.

As the coating method of these slurry paints, there can be mentioned, for example, a method in which the paint is spray-coated on the surface of an article to be coated, water is evaporated and the resin component is cured to form a coating (see U.S. Pat. No. 3,787,230) and a method in which an aqueous dispersion of particles of a nylon resin is spray-coated on an article maintained at a temperature higher than 100° C. to form a coating (see U.S. Pat. No. 2,972,553). As known paints to be used for these coating methods, there can be mentioned, for example, (i) a paint comprising particles of a chlorinated polyester resin having a size smaller than 200 mesh, which are dispersed in water (see U.S. Pat. No. 3,089,783), and (ii) a paint comprising particles of a chlorinated polyester polymer dispersed in water containing a surfactant, an ester of a polyhydric alcohol with a lower aliphatic monocarboxylic acid, an alkaline water softener and a lower aliphatic alcohol (see U.S. Pat. No. 3,446,652).

As the process for preparing these slurry paints, there are known a process comprising dissolving a resin in a water-soluble solvent, for example, an alcohol such as methanol or ethanol, a ketone such as acetone or diacetone alcohol, an ester such as ethyl lactate or ethylene glycol monometyl ether acetate or an ether such as ethylene glycol monoethyl ether, and adding the resulting solution to water being agitated at a high speed to precipitate resin particles in water (see U.S. Pat. No. 3,737,401), and a process comprising pulverizing a solid resin according to an ordinary pulverization method and dispersing the pulverized resin in water.

Slurry paints prepared according to these processes are characterized in that they can be applied at a solid concentration as high as about 40 to about 60% by weight, the coating can be accomplished by using a conventional coating apparatus for solvent dilution type paints and the only volatile component contained in the paint is the water that is used as the dispersion medium. Further, since this aqueous dispersion medium contains no soluble component, saving of resources can be attained and occurrence of environmental pollution can be prevented. Because of these advantages and merits, it is expected that demands for paints of this type will increase drastically from now on.

However, basic problems still remain unsolved in connection with these slurry paints. For example, in slurry paints the size of the resin particles is much larger than in emulsion paints, and the viscosity of water as the dispersion medium is very low. Accordingly, sedimentation or agglomeration of resin particles is readily caused during storage, and when paints are transported through pipes, resin particles are readily precipitated in the pipes or when they are spray-coated, clogging is readily caused in the pump or spray gun. Moreover, sagging is often caused on the coated surface in the coating step. Therefore, the practical utility of these paints is still insufficient.

As means for overcoming these disadvantages, a method comprising adding a thickener or protective colloid to such paints has generally been adopted in the art. For example, there are known a composition formed by adding a non-cellulosic thickener to an emulsion paint and adjusting the pH to 8.0 to 10.5 to thereby improve the dispersion stability (U.S. Pat. No. 3,687,885) and a composition formed by adjusting the pH of a thermosetting paint including a water-soluble aminoplast and an acrylic emulsion to 9 to 11 to thereby improve the dispersion stability (U.S. Pat. No. 3,033,811).

These conventional techniques for emulsion paints, however, are not directly applicable to slurry paints, because slurry paints are different from emulsion paints in various points. For example, the film-forming mechanism in slurry paints is quite different from the film-forming mechanism in emulsion paints. Moreover, in case of slurry paints, a resin particle having a size much larger than the size of emulsion particles is heated and made molten in the coating step to render the resin flowable and obtain a smooth coating, and since the resin particles are much coarser than the emulsion particles, slurry paints are much inferior to emulsion paints in storage stability and flow characteristics in the coating step. Therefore, if a thickener or protective colloid is added to slurry paints in an amount sufficient to attain satisfactory stability, the coating property and storage stability of slurry paints are improved but the melt flowability of the resin particles is degraded by the thickener component. Especially in case of thermosetting paints which are now used widely for obtaining highly durable coatings, in the coating step the curing reaction is completed by heating before the resin particles are sufficiently molten and rendered flowable, and therefore, smooth coatings cannot be obtained. In contrast, if the amount of the thickener component is reduced so as to obtain a sufficiently smooth coating, the stability during storage or transportation is drastically degraded through the surface characteristics and appearance are improved in the resulting coatings. Thus, even if a thickener or protective colloid is incorporated, no practically applicable slurry paints can be obtained.

SUMMARY OF THE INVENTION

The present invention relates to a novel aqueous dispersion type thermosetting coating composition which solves the foregoing problems involved in the above-mentioned various conventional paints. More specifically, the present invention relates to an aqueous dispersion type thermosetting coating composition consisting essentially of a homogeneous mixture of an aqueous medium, a powder of a thermosetting resin having an acid value of 5 to 30, a carboxyl group-containing organic polymeric thickener and an organic amine and/or an alkali metal hyroxide, which is excellent in storage stability and adaptability to the coating operation and provides a coating having an excellent finish appearance.

DETAILED DESCRIPTION OF THE INVENTION

In the novel aqueous dispersion type thermosetting coating composition of the present invention, good storage stability and good adaptability to the coating operation can be attained by incorporation of a very small amount of a specific thickener, and since the amount of the thickener is very small, the melt-flowability of particles is not inhibited in the film-forming step by the thickener and a smooth coating having a good finish appearance can be obtained.

In the coating composition of the present invention, carboxylic groups contained in the thickener and carboxyl groups contained in the resin particles are neutralized by an organic amine and/or an alkali metal hydroxide to increase the viscosity of the aqueous medium and render the surfaces of the resin particles hydrophilic. By combination of these effects, the resin particles can be stably dispersed in the aqueous medium in the presence of a small amount of the thickener if the resin particles have a relatively large size.

It is a primary object of the present invention to provide an aqueous dispersion type coating composition having a good storage stability and a good adaptability to the coating operation.

It is a secondary object of the present invention to provide an aqueous dispersion type coating composition which gives a smooth coating having an excellent finish appearance.

In accordance with the present invention, these objects and other objects and advantages can be attained by an aqueous dispersion type thermosetting coating composition comprising 100 parts by weight of a thermosetting resin powder having an acid value of 5 to 30 and an average particle size of 5 to 50μ, 60 to 200 parts by weight of water, and 0.1 to 0.5 part by weight of a carboxyl group-containing organic polymeric thickener, and at least one member selected from the group consisting of organic amines having a boiling point higher than 100° C. and alkali metal hydroxides, the pH of the composition being in the range of from 7.5 to 9.0.

The thermosetting resin powder that is used in the present invention preferably has a softening point of 5° to 120° C. In case of resin particles having a softening point lower than 5° C., when the particles precipitated in the aqueous medium are agitated at room temperature with a view to forming a homogeneous dispersion again, because of the thickness of the resin particles it is hardly possible to reverse the precipitated and agglomerated particles to primary particles. If the resin powder has a softening point higher than 120° C., good flow characteristics cannot be obtained at the paint baking temperature and hence, a smooth coating cannot be obtained. In view of the efficiency of production of resin particles and the improvement of the storage stability of the slurry paint at an especially high temperature, it is preferred that the softening point of the thermosetting resin as the main component be not lower than 25° C.

The resin powder that is used in the present invention must have an average particle size of 5 to 50μ. If the average particle size is smaller than 5μ, cohesion of particles becomes conspicuous, and the resulting coating composition comes to have properties resembling those of a water-soluble paint and there is brought about a disadvantage that bubbling is readily caused in the film-forming step. If the average particle size is larger than 50μ, sedimentation, precipitation or agglomeration of the resin particles is readily caused during storage and a smooth coating cannot be obtained. Therefore, the intended objects of the present invention cannot be attained by the use of a powdery resin having too large or too small an average particle size. In the present invention, in order to obtain a coating composition excellent in storage stability and giving a smooth coating free of foam formed by bubbling, it is preferred that the average particle size of the powdery resin be not larger than 30μ.

The thermosetting resin powder is composed mainly of a resin having an acid value of 5 to 30. If the acid value is lower than 5, the effect of rendering the surfaces of the resin particles hydrophilic by the organic amine and/or alkali metal hydroxide cannot be sufficiently attained, and the resin particles cannot be dispersed in water sufficiently stably. Accordingly, the amount of the thickener has to be increased and degradation of the surface smoothness and finish appearance in the coating cannot be avoided. If the acid value is higher than 30, the water-swelling property or water-solubility of the resin is enhanced and the resin comes to have properties resembling those of a water-soluble resin. As a result, when the coating composition is applied in a large thickness, the smoothness and other properties of the coating are degraded by bubbling.

The thermosetting resin powder that is used in the present invention may further comprise a cross-linking agent, a curing agent, a catalyst, a pigment and other additives according to need.

The thermosetting resin that is used in the present invention may be of the self-curing type or of the cross-linking agent or curing agent curing type. Known thermosetting resins of both the types can be used in the present invention conveniently. As such thermosetting resin, there can be mentioned, for example, acrylic resins, polyester resins, alkyd resins, epoxy-modified polyester resins and urethane-modified polyester resins. In view of the storage stability, the surface smoothness of the coating and the finish appearance, the use of acrylic resins and polyester resins is especially preferred.

As the cross-linking reaction between a thermosetting resin as mentioned above and a cross-linking agent, there can be adopted known reactions, for example, a reaction between hydroxyl and alkoxyl groups, a reaction between hydroxyl and isocyanate groups, a reaction between hydroxyl and carboxyl groups, a reaction between carboxyl and epoxy groups, a self-crosslinking reaction of alkoxyl groups, a reaction between carboxyl and alkoxyl groups and a reaction between epoxy and alkoxyl groups. Two or more of these reactions may be adopted in combination.

In view of the stability of the resin particles in water and the finish appearance and surface smoothness of the resulting coatings, in the present invention, a reaction between hydroxyl and carboxyl groups, a reaction between hydroxyl and alkoxyl groups, a reaction between hydroxyl and isocyanate groups, a reaction between carboxyl and alkoxyl groups and a self-cross-linking reaction of alkoxyl groups are preferred among the foregoing cross-linking reactions.

The acrylic resin that is used as the thermosetting resin in the present invention can be obtained by polymerizing functional group-containing monomers optionally with other copolymerizable monomers appropriately according to customary methods. As the functional group-containing monomer, there can be mentioned, for example, hydroxyl group-containing monomers such as β-hydroxyethyl acrylate, β-hydroxypropyl acrylate, β-hydroxyethyl methacrylate, β-hydroxypropyl methacrylate, methylol acrylamide and methylol methacrylamide, carboxyl group-containing monomers such as acrylic acid, methacrylic acid, itaconic acid, maleic acid, fumaric acid and monoesters of maleic acid and fumaric acid with monohydric alcohols, alkoxyl group-containing monomers such as N-butoxymethyl methacrylamide and N-butoxymethyl acrylamide, epoxy group-containing monomers such as glycidyl methacrylate, glycidyl acrylate and allyl glycidyl ether, and latent isocyanate monomers capable of forming an isocyanate group under heating, e.g., amine-imide monomers such as trimethylamine methaacrylimide, 1,1-dimethyl-1-(2-hydroxypropyl)amine methacrylimide and 1,1-dimethyl-1-(2,3-dihydroxypropyl) amine methacrylimide, carbamate group-containing monomers such as N-alkenylalkyl carbamates, N-alkenylaryl carbamates, N-alkenylalkyl carbamates and N-styrylalkyl carbamates, and blocked isocyanate group-containing monomers formed by reacting hydroxyl group-containing monomers with partially blocked isocyanates.

As the comonomer to be copolymerized with a functional group-containing monomer such as mentioned above, there can be used, for example, olefinic unsaturated monomers such as ethylene, propylene and isobutylene, aromanic monomers such as styrene, vinyltoluene and α-methylstyrene, esters of acrylic acid and methacrylic acid with alcohols having 1 to 18 carbon atoms such as methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, cyclohexyl acrylate, cyclohexyl methacrylate, 2-ethylhexyl acrylate, 2-ethylhexyl methacrylate, lauryl acrylate and lauryl methacrylate, vinyl esters of carboxylic acids having 2 to 11 carbon atoms such as vinyl acetate, vinyl propionate and vinyl 2-ethylhexylate, and other comonomers such as vinyl chloride, acrylonitrile and methacrylonitrile. These comonomers may be used singly or in the form of a mixture of two or more of them.

The polyester resin that is used as the thermosetting resin in the present invention is prepared by polycondensing at least one polybasic carboxylic acid with at least one polyhydric alcohol according to a known customary method. As the polybasic acid, there can be used, for example, terephthalic acid, isophthalic acid, phthalic anhydride, hexahydrophthalic anhydride, trimellitic anhydride, maleic anhydride and succinic anhydride. As the polyhydric alcohol, there can be mentioned, for example, ethylene glycol, propylene glycol, diethylene glycol, glycerin, trimethylol propane, trimethylol ethane, pentaerythritol and bisphenol A. In order to improve the storage stability, it is preferred to use an aromatic ring-containing polybasic carboxylic acid and an aromatic ring-containing polyhydric alcohol in a total amount of at least 20% by weight.

Commercially available epoxy and alkyd resins which are solid at normal temperatures can be used as the thermosetting resin in the present invention, and urethane- or epoxy-modified polyesters resins synthesized according to the above-mentioned method for production of polyester resins can be used.

As the cross-linking agent to be used for a thermosetting resin such as mentioned above in the present invention, there can be mentioned, for example, alkyl-etherified amino resins obtained by reacting an amino compound such as melamine, urea, benzoguanamine or spiroguanamine with formalin and treating the resulting reaction product with an alcohol having up to 4 carbon atoms such as methanol, ethanol or butanol, blocked isocyanate compounds formed by masking a polyvalent isocyanate with an active hydrogen-containing compound, polyepoxide compounds, polybasic carboxylic acids and their anhydrides, and polyhydric alcohols.

In the coating composition of the present invention, at least two resins capable of reacting with each other or a combination of a resin and a cross-linking agent capable of reacting with the resin may be present in respective resin particles, or the powdery thermosetting resin may be a mixture of particles of these resins prepared independently or a mixture of particles of such resin and of such cross-linking agent prepared independently. Preferred combinations of these cross-linking reaction systems are as follows:

(1) A combination of an acrylic resin having a hydroxyl value of 20 to 120 and a weight average molecular weight of 3,000 to 35,000 with blocked isocyanate compound in which the acrylic resin/isocyanate compound weight ratio is in the range of from 100/5 to 100/100, preferably from 100/10 to 100/50, especially one in which the isocyanate equivalent of the blocked isocyanate compound is in the range of from 100 to 2000 and the mixing ratio of the acrylic resin and blocked isocyanate compound is such that the ratio of the number of isocyanate groups to the number of hydroxyl groups is in the range of from 0.3 to 1.5.

(2) A combination of an acrylic resin having a hydroxyl value of 0.05 to 100 and a weight average molecular weight of 3,000 to 35,000 with an alkyl-etherified amino resin in which the acrylic resin/alkyl-etherified amino resin weight ratio is in the range of from 100/10 to 100/100.

(3) A combination of an acrylic resin containing in the molecule 0.5 to 30% by weight of blocked isocyanate group-containing α,β-ethylenically unsaturated monomer segments with a polyhydric alcohol in which the acrylic resin/polyhydric alcohol weight ratio is in the range of from 100/5 to 100/100.

(4) A combination of a polyester resin having a hydroxyl value of 30 to 100 and a softening point of 25° to 120° C. with at least one member selected from acid anhydrides and blocked isocyanate compounds in which the polyester resin/acid anhydride or blocked isocyanate compound weight ratio is in the range of from 100/5 to 100/80, especially one in which the isocyanate equivalent of the blocked isocyanate compound is 100 to 2000 and the mixing ratio of the blocked isocyanate compound to the polyester resin is such that the ratio of the number of isocyanate groups to the number of hydroxyl groups is in the range of from 0.3 to 1.5.

(5) A combination of a polyester resin having a hydroxyl value of 0.05 to 100 and a softening point of 25° to 120° C. with an alkyl-etherified amino resin in which the polyester resin/alkyletherified amino resin weight ratio is in the range of from 100/10 to 100/100.

(6) A combination of an acrylic resin containing in the molecule 0.5 to 30% by weight of glycidyl group-containing α,β-ethylenically unsaturated monomer segments with a polybasic carboxylic acid in which the acrylic acid/carboxylic acid weight ratio is in the range of from 100/3 to 100/30, preferably from 100/5 to 100/20.

As the polyepoxide compound as the cross-linking agent, there are ordinarily employed epoxy resin having in the molecule an aromatic ring. If such epoxy resin is incorporated into the thermosetting resin system that is used in the present invention, whether it may act as a cross-linking agent or not, it exerts effects of improving corrosion resistance, adhesion and other properties of the resulting coating.

Therefore, in the present invention, it is preferred to incorporate an epoxy resin having in the molecule at least one aromatic ring into the thermosetting resin, and according to this preferred embodiment, properties of the resulting coating can be remarkably improved.

As such epoxy resin, there can be mentioned, for example, bisphenol A type epoxy resins, bisphenol A branched chain type epoxy resins, epoxy-novolak type resins, bisphenol A dimethylglycidyl ether type resins, ester-ether type epoxy resins and resorcin diglycidyl diether type resins. Use of these epoxy resins having a softening point of 50° to 150° C., especially 60° to 120° C., is preferred. Further, it is preferred that the epoxy resin be incorporated in particles of the thermosetting resin in an amount of 1 to 13% by weight, especially 3 to 10% by weight. If the softening point of the epoxy resin is lower than 50° C., the resin powder becomes viscous and the storage stability of the coating composition is degraded. If the softening point of the epoxy resin is higher than 150° C., the melt-flowability of the powdery resin is lowered at the heating and cross-linking step and therefore, a coating having a smooth surface can hardly be obtained. If the amount of the epoxy resin incorporated into the thermosetting resin particles is smaller than 1% by weight, the properties of the resulting coating, such as corrosion resistance and adhesin, cannot be substantially improved. If the amount of the epoxy resin exceeds 13% by weight, because the proportion of the thermosetting resin becomes small, the cross-linking density is reduced in the resulting coating, resulting in lowering of the flexibility in the resulting coating.

In the present invention, in order to improve the smoothness of the coating without substantial reduction of the storage stability and flow characteristics of the resulting coating composition or properties of the resulting coating such as water resistance, corrosion resistance and hardness, it is possible to incorporate into the thermosetting resin 1 to 8% by weight of at least one member selected from the group consisting of (I) compounds having an average molecular weight of 1,000 to 2,500 and represented by the following general formula:

wherein $n$ is an integer of from 2 to 40 and $m$ is an integer of from 2 to 55, and (II) compounds having an average molecular weight of 1,000 to 2,500 and represented by the following general formula:

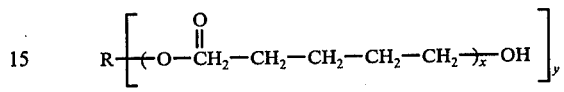

wherein $x$ is an integer of from 2 to 10, $y$ is an integer of from 2 to 4, and R stands for an aliphatic polyhydric alcohol residue, cyclic aliphatic polyhydric alcohol residue or aromatic polyhydric alcohol residue having 2 to 16 carbon atoms.

In the present invention, in order to reduce the amount used of the thickener while keeping good storage stability and coating properties in the coating composition, acid groups of the thermosetting resin are neutralized with a basic substance such as an organic amine or alkali metal hydroxide (namely, the thermosetting resin particles are rendered hydrophilic). In order to further eliminate troubles caused by the use of the thickener, such as inhibition of the flowability of the molten resin at the film-forming step and reduction of properties of the resulting coating, for example, water resistance, corrosion resistance, hardness and flexibility, in the present invention it is preferred to incorporate into the thermosetting resin at least one member selected from the foregoing compounds (I) and (II). At the film-forming step, such compound (I) or (II) is molten and acts as a solvent for the thermosetting resin to improve the melt flowability of the thermosetting resin and give a coating excellent in surface smoothness. Moreover, when the cross-linking reaction starts and the coating is dried and cross-linked, the terminal hydroxyl groups of the compound (I) or (II) reacts with functional groups of the thermosetting resin and/or the cross-linking agent, such as carboxyl, alkoxyl and isocyanate groups, to provide a highly polymeric coating film. Thus, the compound (I) or (II) that is used in the coating composition of the present invention will hereinafter be called "reactive flow adjusting agent". When the above-mentioned compound (I) or (II) as the reactive flow adjusting agent is incorporated in the coating composition of the present invention, not only can the surface smoothness be remarkably improved, but also other properties such as water resistance, corrosion resistance, hardness and flexibility can be maintained at high levels in the resulting coating.

Each of the compounds (I) and (II) has an average molecular weight of 1,000 to 2,500. If the average molecular weight is lower than 1,000, the softening point of the thermosetting resin particles is lowered excessively, and such disadvantages as reduction of the efficiency of production of the resin particles and degradation of the storage stability at high temperatures are brought about. If the average molecular weight is higher than 2,500, the softening point of the thermosetting resin particles cannot be lowered sufficiently and the effect of improving the surface smoothness of the resulting coating is not satisfactory.

A compound (I) in which $n$ in the above general formula is 1 has a high water solubility and generally is greasy or liquid at normal temperatures. Accordingly, if this compound is incorporated, the storage stability of the coating composition is degraded, and the compound is not suitable for the slurry paint intended in the present invention. In the present invention, it is preferred that in the compound (I), $n$ be an integer of from 3 to 20, $m$ be an integer of from 5 to 40 and the average molecular weight be in the range of from 1,500 to 2,300.

Compounds (II) represented by the above general formula can be synthesized by subjecting ε-caprolactone to ring-opening polymerization using a polyhydric alcohol compound as the initiator.

As the polyhydric alcohol compound that is used for the synthesis of the compound (II), there can be mentioned, for example, linear saturated aliphatic dihydric alcohols such as ethylene glycol, propylene glycol, butane diol, pentane diol and hexane diol, polyethylene glycols such as diethylene glycol and triethylene glycol, polypropylene glycols such as dipropylene glycol and tripropylene glycol, branched saturated aliphatic dihydric alcohols such as neopentyl glycol and isobutylene glycol, cyclic aliphatic dihydric alcohols such as cyclohexane diol, aromatic dihydric alcohols such as bisphenol A, and other polyhydric alcohols such as glycerin, trimethylol propane, trimethylol ethane, pentaerythritol and cyclohexane triol. A compound (II) prepared by using a dihydric alcohol as the polyhydric alcohol compound is preferably employed.

The reaction between the polyhydric alcohol compound and ε-caprolactone may be performed according to a customary method.

Compounds (II) represented by the above general formula are synthesized by the above-mentioned method. In the present invention, it is preferred to use compounds (II) prepared by using dihydric alcohols of saturated aliphatic hydrocarbons having 2 to 10 carbon atoms, especially those having OH groups at the molecule ends and above all, polyethylene glycols containing 2 to 8 ethylene glycol units and polypropylene glycols containing 2 to 5 propylene glycol units.

In the present invention, the foregoing compounds (I) and (II) are incorporated in thermosetting resin particles in amounts of 1 to 8% by weight. When the amount is smaller than 1% by weight, the effect of smoothening the coating is insufficient, and if the amount is larger than 8% by weight, the cross-linking density becomes insufficient in the cured coating, resulting in reduction of hardness, water resistance and corrosion resistance. Accordingly, in each case, no practical coating can be obtained.

In addition to the foregoing compounds (I) and (II), known flow modifiers such as oligomers of acrylic esters and silicone oils may be incorporated into the thermosetting resin. If such flow modifier is incorporated in too large an amount, the resin particles become sticky and storage stability is degraded, and also properties of the resulting coating, such as water resistance, corrosion resistance and hardness, are degraded. Accordingly, it is preferred that the flow modifier be incorporated in the resin particles in an amount of up to 1% by weight.

In the present invention, especially good results are obtained when 0.5 to 1% by weight of a known flow modifier as mentioned above and 2 to 5% by weight of at least one member selected from the group consisting of compounds (I) and (II) are incorporated into the thermosetting resin particles.

In the coating composition of the present invention, a carboxyl group-containing organic polymeric thickener is used. This carboxylic group-containing organic polymeric thickener is formed by copolymerization using at least one carboxyl group-containing $\alpha,\beta$-ethylenically unsaturated monomer as the monomer component. This copolymer has an acid value of about 200 to about 500, and it is preferred that the viscosity of an aqueous solution formed by neutralizing the copolymer with an alkali metal hydroxide such as sodium hydroxide and dissolving the neutralized copolymer into water at a concentration of 1% by weight be in the range of from about 1,000 to about 6,000 cps as measured at 25° C. If the acid value of the thickener is lower than 200, the water solubility is poor and the necessary viscosity is hardly obtained. If the acid value is higher than 500, the compatibility of the thickener with the thermosetting resin becomes insufficient and the water resistance of the thickener per se is degraded. As a result, the finish appearance and other properties of the coating are degraded and the intended objects of the present invention cannot be attained. When the viscosity of a 1% by weight aqueous solution of the neutralized thickener is lower than 1,000 cps, satisfactory storage stability cannot be obtained if the thickener is incorporated in an amount specified in the present invention. If the viscosity exceeds 6,000 cps, the smoothness of the coating is often degraded and good results cannot be obtained.

The thickener is incorporated in an amount of 0.1 to 0.5 part by weight per 100 parts by weight of the thermosetting resin powder. If the amount of the thickener is smaller than 0.1 part by weight per 100 parts by weight of the thermosetting resin powder, storage stability and adaptability to the coating operation are degraded, and if the amount of the thickener is larger than 0.5 part by weight, properties of the resulting coating such as surface smoothness and water resistance become insufficient. Accordingly, in each case, the intended objects of the present invention cannot be attained.

The copolymer that is used as the thickener in the coating composition of the present invention is synthesized according to a customary method by copolymerizing (i) at least one member selected from carboxyl group-containing $\alpha,\beta$-ethylenically unsaturated monomers, such as acrylic acid, methacrylic acid, itaconic acid, crotonic acid, fumaric acid, maleic acid and maleic anhydride with (ii) at least one member selected from monoesters of polybasic carboxylic acids such as fumaric acid and maleic acid with monohydric alcohols having 1 to 18 carbon atoms, optionally together with (iii) at least one member selected from comonomers copolymerizable with said carboxyl group-containing monomer, such as aromatic monomers, e.g., styrene, α-methylstyrene and vinyltoluene, esters of acrylic acid and methacrylic acid with alcohols having 1 to 18 carbon atoms, amide-group containing monomers such as acryl amide, methacrylamide, vinyl esters of linear and branched carboxylic acids having 2 to 11 carbon atoms, e.g., vinyl acetate, vinyl halides, e.g., vinyl chloride, nitrile group-containing monomers, e.g., acrylonitrile and methacrylonitrile, and hydroxyl group-containing monomers, e.g., hydroxyethyl methacrylate.

In the present invention, as the basic substance for neutralizing the powdery thermosetting resin and the carboxyl group-containing thickener, there are employed organic amines, alkali metal hydroxides or mixtures thereof.

Among organic amines, those having a boiling point not lower than 100° C. are especially preferred. Ammonia or an organic amine having a boiling point lower than 100° C. is readily evaporated during storage or circulation, and the coating composition is poor in long-term storage stability. Moreover, if such compound is used as the basic substance, it is isolated very quickly in the film-forming step to inhibit the flow of the resin component and therefore, a smooth coating can hardly be obtained.

When a polyepoxide compound such as mentioned above is used as a cross-linking agent and/or for improving the corrosion resistance and adhesion of the coating, the organic amine reacts with epoxy groups. Accordingly, in this case, an alkali metal hydroxide is preferably used as the basic substance. However, the alkali metal hydroxide is left in the coating even after the film-forming step and reduces properties of the coating such as water resistance and chemical resistance. Therefore, in the case where no polyepoxide compound is incorporated in the thermosetting resin, it is preferred to use an organic amine as the basic substance rather than an alkali metal hydroxide.

As pointed out hereinbefore, use of an organic amine having a boiling point not lower than 100° C. is preferred, but in order to adjust the film-forming temperature, it is permissible to use an amine having a boiling point lower than 100° C. or ammonia in an amount of up to 10% by weight, preferably up to 5% by weight, based on the basic substance.

In the present invention, the pH of the coating composition is maintained in the range from 7.5 to 9.0 by said basic substance, therefore, the good storage stability and coating operation of the coating composition and the high finish appearance of the coating can be obtained. The amount of said basic substance to adjust the pH range of the coating composition is preferably from 0.1 to 1.0 part by weight per 100 parts by weight of the thermosetting resin powder. The secondary or tertiary amines having a boiling point not lower than 100° C. are the most preferable in the present invention for maintaining the good storage stability of the coating composition. These amines have a suitable releasing temperature from the coating at the film-forming step.

As the organic amine that is used in the coating composition of the present invention, there can be mentioned, for example, primary amines such as amyl amine, hexyl amine, heptyl amine, octyl amine, nonyl amine, decyl amine, undecyl amine, dodecyl amine, tridecyl amine, pentadecyl amine, cetyl amine, cyclopentyl amine, aniline, toluidine, benzyl amine, 2-amino-2-methyl-1-propanol, 2-aminobutanol and monoethanol amine, secondary amines such as dipropyl amine, dibutyl amine, diamyl amine, methyl aniline, ethyl aniline, dibenzyl amine, diphenyl amine, diethanol amine and morpholine, and tertiary amines such as tripropyl amine, tributyl amine, triamyl amine, dimethyl aniline, deithyl aniline, tribenzyl amine, 2-dimethylamino-2-methyl-1-propanol, N,N-diethylethanol amine, N,N-dimethylethanol amine and triethanol amine.

These amines may be used singly or in the form of mixtures of two or more of them.

As the alkali metal hydroxide that is used as the basic substance in the coating composition of the present invention, there can be mentioned, for example, sodium hydroxide, potassium hydroxide and lithium hydroxide.

In the present invention, in order to further enhance and ensure the effects of improving the storage stability and the smoothness of the resulting coating, up to 1% by weight of a surface active agent or up to 3% by weight of a hydrophilic solvent may be incorporated into the coating composition. Any of known non-ionic surface active agents, anionic surface active agents, cationic surface active agents and amphoteric surface active agents can be used as such surface active agent. More specifically, as the non-ionic surface active agent, there can be mentioned, for example, sorbitan fatty acid esters, polyoxyethylene sorbitan fatty acid esters, polyoxyethylene sorbitol fatty acid esters, polyoxyethylene fatty acid esters, polyoxyethylene alcohol ethers, glycerin fatty acid esters, propylene glycol fatty acid esters, polyoxyethylene-castor oil derivatives, polyoxyethylene alkyl phenyl ethers, alkyl esters of phosphoric acid and polyoxyethylene esters of phosphoric acid; as the anionic surface active agent, there can be mentioned, for example, salts of alkyl sulfates, salts of polyoxyethylene alkyl ether sulfate, salts of alkyl sulfosuccinates and N-acylsarcosine salts; and as the cationic surface active agent, there can be mentioned, for example, quaternary ammonium salts and pyridinium salts. In view of the dispersion stability of the thermosetting resin powder and properties of the resulting coating, non-ionic surface active agents are preferred among these surface active agents, and non-ionic surface active agents having an HLB value of 8 to 18 are especially preferred. As the hydrophilic solvent, there can be used, for example, methanol, ethanol, isopropanol, propanol, butanol, isobutanol, ethylene glycol, propylene glycol, methylethyl ketone and ethyl acetate.

The thermosetting resin powder that is used in the present invention is formed according to a known method, for example, a method comprising mechanically pulverizing a solid resin, a method comprising spray-drying a resin solution or a method comprising suspending a resin solution into water, removing the solvent and withdrawing solid particles. Mixing under agitation of the thermosetting resin, the thickener, the basic substance and other components can be performed by using a known dispersing machine, for example, a disperser, a roll mill, a sand mill, a ball mill, a sussmeyer mill or centry mill.

The so prepared aqueous dispersion type thermosetting coating composition of the present invention is excellent in the storage stability and the adaptability to the coating operation, and coatings prepared from this composition are excellent in the finish appearance and other properties.

The present invention will now be described in detail by reference to the following Examples that by no means limit the scope of the present invention. In each of these Examples, all of "parts" and "%" are by weight unless otherwise indicated.

Resins A to I used in these Examples were prepared according to the following methods.

Resin Solution A

A reaction vessel equipped with an agitator, a thermometer and a nitrogen gas introducing device was charged with 100 parts of ethyl acetate and the temperature was elevated to 80° C., and a mixture comprising 30 parts of methyl methacrylate, 30 parts of styrene, 13 parts of 2-ethylhexyl methacrylate, 8 parts of β-hydroxyethyl methacrylate, 15 parts of N-n-butoxymethyl methacrylamide, 4 parts of methacrylic acid and 2 parts of azobisisobutyronitrile as an initiator was added dropwise over a period of 90 minutes. After completion of the dropwise addition, 1 part of azobisisobutyronitrile was further added and reaction was conducted for 5 hours to obtain a transparent viscous resin solution A having an acid value of 21 and a non-volatile content of 50%.

When the solvent was removed from the resin solution A and the melting point of the solid residue was measured, it was found that the melting point was 75° to 76° C.

Resin Solution B

The same reaction vessel as used for the preparation of the resin solution A was charged with 100 parts of methylethyl ketone and the temperature was elevated to 80° C., and a mixture comprising 42 parts of methyl methacrylate, 33 parts of 2-ethylhexyl methacrylate, 2.5 parts of 2-ethylhexyl acrylates, 5 parts of styrene, 15.5 parts of 2-hydroxypropyl methacrylate, 2 parts of acrylic acid, 2 parts of 2,2'-azobis-(2,4-dimethylvaleronitrile) as an initiator and 1 part of dodecyl mercaptan as a polymerization regular was added dropwise over a period of 180 minutes. After completion of the dropwise addition, 1 part of 2,2'-azobis-(2,4-dimethylvaleronitrile) was further added and reaction was conducted at 83° C. to obtain a transparent resin solution B having an acid value of 15.5, a hydroxyl value of 60 and a non-volatile content of 50%.

When the solvent was removed from the resin solution B and the melting point of the solid residue was measured, it was found that the melting point was 81° to 85° C.

Resin Solution C

The same reaction vessel as used for the preparation of the resin solution A was charged with 100 parts of methylethyl ketone and the temperature was elevated to 80° C., and a mixture comprising 34 parts of methyl methacrylate, 5 parts of styrene, 27 parts of 2-ethylhexyl methacrylate, 1 part of 2-ethylhexyl acrylate, 16 parts of 2-hydroxyethyl methacrylate, 14 parts of 1,1-dimethyl-1-(2-hydroxypropyl)amine methacrylimide, 1 part of acrylic acid, 2 parts of 2,2'-azobisisobutyronitrile as an initiator and 0.9 part of dodecyl mercaptan as a polymerization regulator was added dropwise over a period of 150 minutes. After completion of the dropwise addition, 1 part of azobisisobutyronitrile was added and reaction was conducted at 83° C. for 5 hours to obtain a resin solution C having an acid value of 27 and a non-volatile content of 50%. When the solvent was removed from the resin solution C and the melting point of the solid residue was measured, it was found that the melting point was 90° to 95° C.

RESIN SOLUTION D

The same reaction vessel as used for the preparation of the resin solution A was charged with 100 parts of methylethyl ketone and the temperature was elevated to 80° C., and a mixture comprising 10 parts of methyl methacrylate, 30 parts of styrene, 10 parts of ethyl acrylate, 10 parts of butyl methacrylate, 25 parts of a blocked isocyanate group-containing monomer (see Note 1 given below), 13 parts of 2-hydroxyethyl methacrylate, 2 parts of methacrylic acid, 2 parts of azobisisobutyronitrile as an initiator and 1 part of dodecyl mercaptan as a polymerization regulator was added dropwise over a period of 120 minutes. After completion of the dropwise addition, 1 part of azobisisobutyronitrile was added and reaction was conducted at 83° C. for 5 hours to obtain a transparent viscous self-crosslinking resin solution D having an acid value of 13 and a non-volatile content of 50%. When the solvent was removed and the melting point of the solid residue was measured, it was found that the melting point was 75° to 85° C.

NOTE 1

The blocked isocyanate group-containing monomer used was a compound having the following structure:

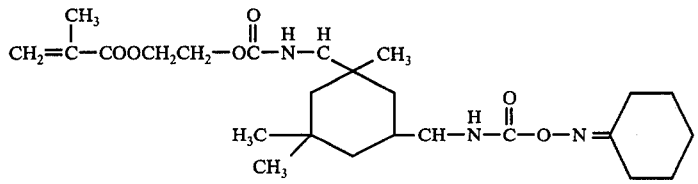

which was synthesized from 1 mole of 2-hydroxyethyl methacrylate, 1 mole of isophorone diisocyanate and 1 mole of cyclohexanone oxime.

RESIN E

A mixture comprising 52 parts of methyl methacrylate, 30 parts of butyl acrylate, 16 parts of glycidyl methacrylate, 1 part of methacrylic acid, 2.5 parts of azobisisobutyronitrile and 1.0 part of dodecyl mercaptan was subjected to suspension polymerization according to a known method to obtain a powdery acrylic resin (resin E) having an acid value of 7 and a melting point of 89° to 92° C.

RESIN F

A mixture of 58 parts of terephthalic acid, 50.8 parts of trimethylol propane and 37 parts of trimethylhexane diol was subjected to esterification reaction according to a known method to obtain a polyester resin (resin F) having an acid value of 16, a hydroxyl value of 140 and a melting point of 56° to 60° C.

RESIN SOLUTION G

A resin solution G was prepared in the same manner as described above with respect to the preparation of the resin solution B except that acrylic acid used for the formation of the resin solution B was replaced by styrene. A resin recovered from this resin solution G by removal of the solvent was found to have a melting point of 80° to 84° C., an acid value lower than 1 and a hydroxyl value of 60.

RESIN H

A mixture comprising 58 parts of terephthalic acid, 50 parts of trimethylol propane and 37.9 parts of trimethylhexane diol was subjected to esterification reaction according to a known method to obtain a polyester resin (resin H) having an acid value of 45, a hydroxyl value of 140 and a melting point of 58° to 62° C.

RESIN SOLUTION I

A mixture comprising 100 parts of ethyl acetate, 31 parts of methyl methacrylate, 32 parts of styrene, 13 parts of 2-ethylhexyl methacrylate, 8 parts of β-hydroxyethyl methacrylate, 15 parts of glycidyl methacrylate, 1 part of methacrylic acid and 3 parts of azobisisobutyronitrile was subjected to solution polymerization according to a known method to obtain a transparent viscous resin solution I having an acid value of 7 and a non-volatile content of 50%. When the solvent was removed from this resin solution I and the melting point of the solid residue was measured, it was found that the melting point was 75° to 76° C.

EXAMPLE 1

A mixture comprising 30 parts of titanium dioxide, 140 parts of the resin solution A and 0.5 part of a flow modifier (Modaflow manufactured and sold by Monsanto Co.) was homogeneously kneaded and dispersed to obtain a white paint solution. This paint solution was added to 4000 parts of water under high speed dispersion to form fine dispersed liquid drops while dissolving out the solvent into water. Then, the liquid mixture of water and the solvent was removed by filtration, and filtration and washing were repeated to obtain a water-containing powdery resin filter cake. By using the so prepared powdery resin cake, a slurry paint was prepared according to the following recipe.

Namely, 84 parts of the water-containing powdery resin cake (having a solid content of 60%), 0.3 part of a non-ionic surface active agent (Emalgen # 935 manufactured and sold by Kao Soap Co. Ltd.; HLB value = 17.5), 0.4 part of a carboxyl group-containing thickener (Acrizol ASE-73 manufactured and sold by Rohm & Haas Co.; solid content = 40%; viscosity of 1% by weight aqueous solution = 1000 cps; acid value = 210), 0.3 part of a basic substance (diethanol amine) and 15 parts of water were uniformly kneaded and dispersed to obtain a slurry paint (self-curing type) having a solid content of 50%, a pH of 8.0 and average resin particle size of 25μ.

Storage of the so prepared paint in a sealed vessel at 50° C. for 1 week caused no precipitation or cohesin of the resin particles. A coating obtained by applying the paint to an iron plate, pre-heating it at 80° C. for 10 minutes and baking it at 180° C. for 20 minutes was excellent in smoothness.

EXAMPLE 2

A mixture comprising 100 parts of the resin solution B, 30 parts of a butylated melamine resin (cross-linking agent manufactured and sold under the tradename of "Melan 27" by Hitachi Chemical Co. Ltd.), 30 parts of titanium dioxide and 2 parts of a flow modifier (the above-mentioned Modaflow) was homogeneously dispersed by a sand mill to obtain a white paint solution.

The so obtained paint solution was added to 4000 parts of water under high speed agitation, and a water-contained powdery resin cake was prepared by conducting wet pulverization in the same manner as described in Example 1. By using this powdery resin cake, a slurry paint was prepared according to the following recipe.

Namely, 91 parts of the water-containing powdery resin cake (having a solid content of 55%), 0.2 part of a non-ionic surface active agent (Emazol 4130 manufactured and sold by Kao Soap Co. Ltd.; HLB value = 15.3), 0.72 part of a carboxyl group-containing thickener (Acrizol ASE-60 manufactured and sold by Rohm & Haas Co.; solid content = 28%; viscosity of 1% by weight aqueous solution = 2000 cps; acid value = 250), 0.2 part of a basic substance (N,N-dimethyl ethanolamine) and 8 parts of water were homogeneously kneaded and dispersed to obtain a slurry paint having a solid content of 50%, a pH of 8.2 and an average resin particle size of 15μ. When the storage stability of this slurry paint was tested in the same manner as described in Example 1, it was found that the paint had a very excellent storage stability. A coating having a thickness of 40μ, which was obtained by applying this paint to zinc phosphate-treated steel plate, pre-heating it at 80° C. for 10 minutes and baking it at 140° C. for 20 minutes, was excellent in the smoothness and finish appearance.

EXAMPLE 3

A slurry paint having a pH of 8.4 was prepared by repeating the procedures of Example 2 in the same manner as in Example 2 except that instead of dimethyl ethanolamine used in Example 2, the same amount of dibutyl amine was used as the basic substance. The so prepared paint was as excellent as the paint obtained in Example 2 with respect to storage stability and the smoothness and finish appearance of the coating.

COMPARATIVE EXAMPLE 1

A paint having a pH of 8.1 was prepared by repeating the procedures of Example 2 in the same manner as in Example 2 except that instead of dimethyl ethanolamine used in Example 2, the same amount of ammonia was used as the basic substance. This paint was inferior in storage stability, and a coating prepared from this paint in the same manner as in Example 2 lacked smoothness.

COMPARATIVE EXAMPLE 2

A slurry paint prepared in the same manner as in Example 2 except that instead of Acrizol ASE-60 as the thickener, the same amount of hydroxyethyl cellulose was used was very poor in storage stability, and when it was subjected to the storage stability test under the same conditions as in Example 1, cohesion and precipitation took place.

In order to attain a storage stability as good as that of the paint obtained in Example 2, the amount incorporated of hydroxyethyl cellulose had to be increased by 5 times. In this case, however, the smoothness and corrosion resistance of the resulting coating were drastically degraded.

EXAMPLE 4

A mixture comprising 101.0 parts of the resin solution B, 19.5 parts of a blocked isocyanate resin (cross-linking agent manufactured and sold under the tradename "Crelan Ue 6109" by Bayer A. G.), 1.0 part of dibutyl tin dilaurate, 30.0 parts of titanium dioxide, 1.0 part of a flow modifier (Baysilon PL manufactured and sold by Bayer A.G.) and 30.0 parts of methylethyl ketone was kneaded in a ball mill to form a white paint solution, and a water-containing powdery resin cake was prepared by subjecting this paint solution to wet pulverization in the same manner as in Example 1. (Dibutyl tin dilaurate was used as a dissociation catalyst for the isocyanate resin.) By using the so prepared powdery resin cake, a slurry paint was prepared according to the following recipe.

Namely, 88 parts of the water-containing powdery resin cake (having a solid content of 57%), 0.1 part of a surface active agent (the above-mentioned Emalgen # 935), 0.2 part of a basic substance (dimethylamino ethanol), 0.8 part of thickener (Acrizol ASE-95 manufactured and sold by Rohm & Haas Co.; solid content = 20%; viscosity of 1% by weight aqueous solution = 5000 cps; acid value = 432) and 23 parts of water were homogeneously kneaded and dispersed to obtain a white slurry paint having a solid content of 48%, a pH of 8.2 and an average particle size of 11μ. A coating obtained by applying this slurry paint to a zinc phosphate-treated iron plate, pre-heating it at 80° C. for 10 minutes and baking it at 180° C. for 20 minutes was excellent in gloss, smoothness and corrosion resistance.

COMPARATIVE EXAMPLE 3

A slurry paint was prepared under the same conditions as in Example 4 except that instead of the resin solution B, the same amount of the resin solution G was employed. This paint was poor in storage stability, and when it was stored at 50° C. in a sealed vessel, cohesion and precipitation took place after passage of only one day.

EXAMPLE 5

A mixture comprising 100 parts of the resin solution C, 0.5 part of a flow modifier (the above-mentioned Baysilon PL), 5 parts of Phthalocyanine Blue and 20 parts of methylethyl ketone was homogeneously kneaded and dispersed and subjected to wet pulverization. Then, 83.6 parts of the so obtained water-containing powdery resin cake (having a solid content of 60%) was mixed with 0.1 part of the same surface active agent as used in Example 4, 0.2 part of the same basic substance as used in Example 4 and 0.8 part of the same thickener as used in Example 4, and 27.4 parts of water was added to the mixture so that the solid content was adjusted to 45%. The so prepared slurry paint had a pH of 7.7 and an average resin particle size of 40μ. The paint was excellent in storage stability and a coating prepared from this paint was excellent in smoothness and corrosion resistance.

EXAMPLE 6

A mixture comprising 100 parts of the resin solusion D, 0.5 part of a flow modifier (the above-mentioned Baysilon PL), 1 part of carbon black, 20 parts of methylethyl ketone and 1 part of dibutyl tin dilaurate was homogeneously kneaded and dispersed in a ball mill and was then subjected to wet pulverization. Then, 91.2 parts of the so prepared water-containing powdery resin cake (having a solid content of 55%) was mixed with 0.1 part of the same surface active agent as used in Example 4, 0.2 part of the same basic substance as used in Example 4 and 0.8 part of the same thickener as used in Example 4, and 19.8 parts of water was added to the mixture so that the solid content was adjusted to 45%. The resulting slurry paint had a pH of 8.8 and an average resin particle size of 11μ and was excellent in storage stability. A coating formed from this slurry paint was as excellent as the coating obtained in Example 5 with respect to the properties.

EXAMPLE 7

A homogeneous mixture of 68 parts of the resin E, 10 parts of dodecane-dicarboxylic acid (cross-linking agent), 20 parts of titanium dioxide and 1.0 part of a flow modifier (the above-mentioned Modaflow) was melt-kneaded by a biaxial extruder to obtain a homogeneous dispersion paint pellet. The pellet was pulverized by a bantam mill to obtain a white powdery paint having an average particle size of 18μ. By using this white powdery paint, a slurry paint was prepared according to the following recipe.

Namely, 100 parts of the white powdery paint, 0.3 part of a surface active agent (Nikkol TOP-O manufactured and sold by Nikko Chemicals Co., Ltd.), 0.4 parts of a basic substance (N,N-diethyl ethanolamine), 2.0 parts of a thickener (the above-mentioned Acrizol ASE-95), 3.0 parts of ethylene glycol and 100 parts of water were homogeneously kneaded and dispersed to obtain a white slurry paint having a solid content of 55%, a pH of 8.4 and an average particle size of 18μ. This paint was excellent in storage stability and a coating prepared from this paint was excellent in smoothness and corrosion resistance.

EXAMPLE 8

A homogeneous mixture comprising 40 parts of the resin F., 30 parts of a blocked isocyanate resin (the above-mentioned Crelan Ue 6109), 1.0 part of dibutyl tin dilaurate, 1.0 part of a flow modifier (the above-mentioned Modaflow) and 30.0 parts of titanium dioxide was melt-kneaded by a hot roller and then pulverized by a bantam mill to obtain a resin powder having an average particle size of 25μ. By using the so prepared resin powder, a slurry was prepared according to the following recipe.

Namely, 100 parts of the resin powder, 0.2 part of a surface active agent (Dimol N manufactured and sold by Kao Soap Co., Ltd.), 1.5 parts of a thickener (the above-mentioned Acrizol ASE 60), 0.5 part of a basic substance (dimethylamino ethanol) and 100 parts of water were homogeneously kneaded and dispersed to obtain a white slurry paint having a solid content of 50%, a pH of 8.6 and an average particle size of 35μ. This paint was excellent in storage stability and a coating formed from this paint was excellent in smoothness and corrosion resistance.

COMPARATIVE EXAMPLE 4

Procedure of Example 8 were repeated in the same manner as in Example 8 except that instead of the resin F., the same amount of the resin H was employed. In the resulting slurry paint, which had a pH of 7.3, resin particles were swollen with water, and extreme foaming was observed in a coating formed from this paint.

COMPARATIVE EXAMPLE 5

Procedures of Comparative Example 4 were repeated in the same manner as in Comparative Example 4 except that the amount of the basic substance was changed to 2.5 parts. The resin powder was dissolved in water and an intended slurry paint was not obtained.

Results of measurements made on paints prepared in the foregoing Examples and Comparative Examples and on coatings prepared from these paints are summarized in Table 1. Since a slurry paint was not obtained in Comparative Example 5, data of Comparative Example 5 are not shown in Table 1.

Table 1

| Example No. | Storage Stability[1] | Circulation Stability[2] | Adaptability to coating operation[3] | Smoothness[4] | Gloss[5] | Salt spray Resistance[6] |
|---|---|---|---|---|---|---|
| 1 | not changed | not changed | good | good | 91 | ± 3 mm |
| 2 | " | " | " | " | 92 | " |
| 3 | " | " | " | " | 93 | " |
| 4 | " | " | " | " | 92 | " |
| 5 | " | " | " | " | 91 | " |
| 6 | " | " | " | " | 90 | " |
| 7 | " | " | " | " | 93 | " |
| 8 | " | " | " | " | 94 | " |
| Comparative Example 1 | conspicuous precipitation | clogging of pump | " | orange peel surface | 88 | " |
| Comparative Example 2-1[7] | cohesion, gelation | " | sagging | orange peel surface, foaming | 85 | ± 6 mm |
| Comparative Example 2-2[8] | not changed | not changed | good | " | 42 | ± 10 mm |
| Comparative Example 3 | cohesion, gelation | clogging of pump | sagging | good | 93 | ± 3 mm |
| Comparative Example 4 | not changed | not changed | insufficient granulation | conspicuous | — | — |

Notes:
[1] The sample paint was stored in a sealed vessel at 50° C. for 7 days.
[2] 18 liter of the sample paint was circulated and transported for 1 week by a plunger pump.
[3] The adaptability of air spray coating operation was evaluated.
[4] The smoothness was evaluated by observation with the naked eye.
[5] The gloss was evaluated based on 60°/60° specular gloss.
[6] The coating was cut to the substrate and subjected to the salt spray test for 100 hours. Then, an adhesive tape was applied to the coating and peeled. The width of the coating peeled together with the adhesive tape was measured.
[7] In Comparative Example 2, 0.4 part of hydroxyethyl cellulose was added as a thickener to 100 parts of the resin powder.
[8] In Comparative Example 2, 1.2 parts of hydroxyethyl cellulose was added as a thickener to 100 parts of the resin powder.

EXAMPLE 9

A mixture comprising 29.5 parts of titanium dioxide, 110 parts of the resin solution I, 10 parts of dodecanedicarboxylic acid (cross-linking agent), 3 parts of a reactive flow adjusting agent (compound I of the above general formula in which $n$ is 4 and which has an average molecular weight of 1000 to 1200), 0.5 parts of a flow modifier (the above-mentioned Modaflow) and 40 parts of ethyl acetate was homogeneously kneaded and dispersed to obtain a white paint solution. This paint solution was added to 4000 parts of water under high speed agitation to form fine dispersed liquid drops and dissolve out the solvent into water. The liquid mixture of the solvent and water was removed by filtration, and filtration and washing were repeated to obtain a water-containing powdery resin cake. By using the so prepared powdery resin cake, a slurry paint was prepared according to the following recipe.

Namely, 84 parts of the water-containing powdery resin cake (having a solid content of 60%), 0.3 part of a non-ionic surface active agent (the above-mentioned Emalgen # 935), 0.6 part of a carboxyl group-containing thickener (the above-mentioned Acrizol ASE-75), 16 parts of water and 0.2 part of diethanol amine were homogeneously kneaded and dispersed to obtain a slurry paint having a solid content of 50%, a pH of 8.0 and an average resin particle size of 25μ. Then, 100 parts of the so prepared paint was diluted into 10 parts of water, and spray-coated on an iron plate. Then, the paint coat was pre-heated at 80° C. for 10 minutes and baked at 160° C. for 20 minutes. The resulting coating was excellent in the smoothness. When the above paint was stored in a sealed vessel at 50° C. for 1 week, neither precipitation nor cohesion took place.

EXAMPLE 10

A mixture comprising 100 parts of the resin solution B, 25 parts of a butylated melamine resin (the above-mentioned Melan 27), 5 parts of a reactive flow adjusting agent (compound I of the above general formula in which $n$ is 6 and which has an average molecular weight of 1600 to 1700), 30 parts of titanium dioxide and 0.63 part of a flow modifier (the above-mentioned Modaflow) was homogeneously dispersed in a sand mill to obtain a white paint solution.

The so prepared paint solution was added to 4000 parts of water under high speed agitation and subjected to wet pulverization in the same manner as in Example 9 to obtain a water-containing powdery resin cake. By using this powdery resin cake, a slurry paint was prepared according to the following recipe.

Namely, 70 parts of the powdery resin cake (having a solid content of 55%), 0.2 part of a non-ionic surface active agent (the above-mentioned Emazol 4130), 0.9 part of a carboxyl group-containing thickener (the above-mentioned Acrizol ASE-95), 0.2 part of a basic substance (dimethylamino ethanol) and 28.5 parts of water were homogeneously kneaded and dispersed to obtain a slurry paint having a solid content of 40%, a pH of 8.2 and an average particle size of 15μ, which was found to be as excellent as the paint obtained in Example 9 with respect to storage stability.

A coating having a thickness of 40μ, which was formed by applying the so prepared slurry paint to a zinc phosphate-treated steel plate, pre-heating it at 80° C. for 10 minutes and baking it at 140° C. for 20 minutes, was excellent in smoothness and finish appearance.

EXAMPLE 11

A mixture comprising 96 parts of the resin solution B, 5.0 parts of a reactive flow adjusting agent (compound I of the above general formula in which $n$ is 4 and which has an average molecular weight of 1450 to 1580), 19.0 parts of a blocked isocyanate resin (the above-mentioned Crelan Ue 6109), 1.0 part of dibutyl tin dilaurate (dissociation catalyst), 30.0 parts of titanium dioxide, 1.0 part of a flow modifier (the above-mentioned Baysilon PL) and 30.0 parts of methylethyl ketone was kneaded in a ball mill to form a white paint solution, and this paint solution was subjected to wet pulverization in the same manner as in Example 9 to obtain a water-containing powdery resin cake. By using the so prepared powdery resin cake, a slurry paint was prepared according to the following recipe.

Namely, 88 parts of the water-containing powdery resin cake (having a solid content of 57%), 0.1 part of a surface active agent (the above-mentioned Emalgen # 935), 0.2 part of a basic substance (dimethylamino ethanol), 0.8 part of a thickener (the above-mentioned Acrizol ASE 60) and 23 parts of water were homogeneously kneaded and dispersed to obtain a white slurry paint having a solid content of 48%, a pH of 8.2 and an average particle size of 11μ. A coating prepared by applying this slurry paint to a zinc phosphate-treated iron plate, pre-heating it at 80° C. for 10 minutes and baking it at 180° C. for 20 minutes was excellent in gloss, smoothness and corrosion resistance.

EXAMPLE 12

A slurry paint was prepared in the same manner as in Example 11 except that instead of the compound I of the above general formula in which $n$ was 4 and which had an average molecular weight of 1,450 to 1,580, 5 parts of a compound I of the above general formula in which $n$ was 4 and which had an average molecular weight of 1,968 to 2,200 was used as the reactive flow adjusting agent and the flow modifier used in Example 11 was not used at all. A coating prepared from this slurry paint in the same manner as in Example 11 was excellent in smoothness.

EXAMPLE 13

A mixture comprising 100 parts of the resin solution D, 4.5 parts of a reactive flow adjusting agent (compound I of the above general formula in which $n$ is 8 and which has an average molecular weight of 1800 to 2000), 0.5 part of a flow modifier (the above-mentioned Baysilon PL), 1 part of carbon black, 20 parts of methylethyl ketone and 1 part of dibutyl tin dilaurate was homogeneously kneaded and dispersed in a ball mill and was then subjected to wet pulverization to obtain a water-containing powdery resin cake. By using the so prepared water-containing powdery resin cake, a slurry paint was prepared according to the following recipe.

Namely, 83.6 parts of the water-containing powdery resin cake (having a solid content of 60%), 0.1 part of a surface active agent (the above-mentioned Emalgen # 935), 0.2 part of a basic substance (triethanol amine) and 0.8 part of a thickener (the above-mentioned Acrizol ASE 60) were homogeneously kneaded and dispersed to obtain a slurry paint having a solid content of 60%, a pH of 8.8 and an average resin particle size of 11μ. This paint was excellent in the storage stability and a coating formed from this paint had properties as excellent as those of the coating obtained in Example 9.

EXAMPLE 14

A homogeneous mixture comprising 40 parts of the resin F, 30 parts of a blocked isocyanate resin (the above-mentioned Crelan Ue 6109), 1.0 part of dibutyl tin dilaurate (dissociation catalyst), 7.0 part of a reactive flow adjusting agent (compound I of the above general formula in which $n$ is 10 and which has an average molecular weight of 2200 to 2300), 1.0 part of a flow modifier (the above-mentioned Modaflow) and 30.0 parts of titanium dioxide was melt-kneaded by a hot roller and pulverized by a bantam mill to obtain a powdery resin having an average resin particle size of 25μ. By using the so prepared powdery resin, a slurry paint was prepared according to the following recipe.

Namely, 100 parts of the resin powder, 0.2 part of a surface active agent (the above-mentioned Dimol N), 1.5 parts of a thickener (the above-mentioned Acrizol ASE 60), 0.5 part of a basic substance (dimethylamino ethanol), 100 parts of water and 5 parts of ethylene glycol were homogeneously kneaded and dispersed to obtain a white slurry paint having a solid content of 50%, a pH of 8.6 and an average resin particle size of 35μ.

This paint was excellent in the storage stability, and a coating formed from this paint was excellent in the smoothness and corrosion resistance.

COMPARATIVE EXAMPLE 6

A slurry paint was prepared in the same manner as in Example 11 except that instead of the compound I of the above general formula in which $n$ was 4 and which had a molecular weight of 1450 to 1580, the same amount of a compound I of the above general formula in which $n$ was 4 and which had a molecular weight of 500 to 600 was used as the reactive flow adjusting agent. Since the resin per se was sticky, at the wet pulverization the resin particles were coarsened by agglomeration of the resin particles or re-cohesion of the pulverized particles, and the resin particles in the resulting paint had an average particle size of 35μ. When this paint was stored under the same conditions as in Example 9, gelatinous agglomerates of the resin powder were formed and even if the paint was agitated by an agitator of the rotary blade type, these agglomerates could not be re-dispersed.

COMPARATIVE EXAMPLE 7

A slurry paint was prepared in the same manner as in Example 13 except that the reactive flow adjusting agent used in Example 13 was replaced by a compound I of the above general formula in which $n$ was 8 and which had an average molecular weight of 3,000 to 3,300. A coating prepared from the resulting paint in the same manner as in Example 13 was much inferior to the coating obtained in Example 13 with respect to the smoothness.

Results of tests made on paints and coatings prepared in the foregoing Examples and Comparative Examples are shown in Table 2.

Table 2

| Example No. | Storage[1] Stability of Paint | Pulveriza-[2] bility of Resin | Properties of Coating | | | | |
|---|---|---|---|---|---|---|---|
| | | | Smoothness[3] | Gloss[4] | Impact[5] Resistance | Erichesen[6] Value | Salt[7] Spray Resistance |
| 9 | not changed | good | good | 90 | 30 cm | 7< | ± 3 mm |
| 10 | " | " | " | 92 | 30 cm | 7< | ± 3 mm |
| 11 | " | " | " | 91 | 30 cm | 7< | ± 3 mm |
| 12 | " | " | " | 90 | 35 cm | 7< | ± 3 mm |
| 13 | " | " | " | 89 | 40 cm | 7< | ± 3 mm |
| 14 | " | " | " | 91 | 50 cm | 7< | ± 3 mm |
| Comparative Example 6 | cohesion, gelation | difficult | " | 87 | 50 cm | 7< | ± 6 mm |
| Comparative | not changed | good | orange | 89 | 30 cm | 4 | ± 3 mm |

Table 2-continued

| Example No. | Storage[1] Stability of Paint | Pulveriza-[2] bility of Resin | Properties of Coating |||||
|---|---|---|---|---|---|---|---|
| | | | Smoothness[3] | Gloss[4] | Impact[5] Resistance | Erichesen[6] Value | Salt[7] Spray Resistance |
| Example 7 | | | peel surface | | | | |

Note
[1] Same as in Table 1.
[2] Ease or difficulty in pulverizing the resin according to the method adopted in each Example or Comparative Example was examined.
[3] Same as in Table 1.
[4] Same as in Table 1.
[5] The impact resistance as determined according to the method f JIS K-5400, 6-13-3B.
[6] The measurement was conducted by using an Erichsen tester.
[7] The coating was cut to the substrate and subjected to the salt spray test for 200 hours. Then, an adhesive tape was applied to the coating and peeled. The width of the coating peeled together with the adhesive tape was measured.

EXAMPLE 15

A mixture comprising 29.5 parts of titanium dioxide, 110 parts of the resin solution I, 10 parts of dodecanedicarboxylic acid (cross-linking agent), 3 parts of a reactive flow adjusting agent (compound II of the above general formula in which R is —$CH_2CH_2$—O—$CH_2CH_2$—O—$CH_2CH_2$— and x is 2 and which has an average molecular weight of 1500 to 1800), 0.5 part of a flow modifier (the above-mentioned Modaflow) and 40 parts of ethyl acetate was homogeneously kneaded and dispersed to obtain a white paint solution. Then, this paint solution was added to 4000 parts of water under high speed agitation to form fine dispersed liquid drops and dissolve out the solvent into water. The liquid mixture of the solvent and water was removed by filtration, and filtration and washing were repeated to obtain a water-containing powdery resin cake. By using the so obtained powdery resin cake, a slurry paint was prepared according to the following recipe.

Namely, 84 parts of the water-containing powdery resin cake (having a solid content of 60%), 0.3 part of a non-ionic surface active agent (the above-mentioned Emalgen # 935), 0.6 part of a carboxyl group-containing thickener (the above-mentioned Acrizol ASE 75), 0.2 part of dibutyl amine and 16 parts of water were homogeneously kneaded and dispersed to obtain a slurry paint having a solid content of 50%, a pH of 8.0 and an average resin particle size of 20μ.

Then, 100 parts of the so prepared slurry paint was diluted with 10 parts of water and spray-coated on an iron plate. The paint coat was pre-heated at 80° C. for 10 minutes and baked at 160° C. for 20 minutes. The resulting coating was excellent in smoothness. When this paint was stored in a sealed vessel at 50° C. for 1 week, neither precipitation nor cohesion took place.

EXAMPLE 16

A mixture comprising 100 parts of the resin solution B, 25 parts of a butylated melamine resin (the above-mentioned Melan 27), 5 parts of a reactive flow adjusting agent (compound II of the above general formula in which R is

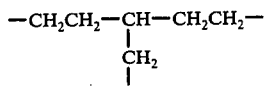

and x is 3 and which has an average molecular weight of 1900 to 2200), 30 parts of titanium dioxide and 0.63 part of a flow modifier (the above-mentioned Modaflow) was homogeneously dispersed in a sand mill to obtain a white paint solution. This paint solution was added to 4000 parts of water under high speed agitation and subjected to wet pulverization in the same manner as in Example 15 to obtain a water-containing powdery resin cake. By using this powdery resin cake, a slurry paint was prepared according to the following recipe.

Namely, 70 parts of the water-containing powdery resin cake having a solid content of 55%, 0.2 part of a non-ionic surface active agent (the above-mentioned Emazol 4130), 0.9 part of a carboxyl group-containing thickener (the above-mentioned Acrizol ASE 95), 0.2 part of a basic substance (N,N-dimethylamino ethanol) and 28.5 parts of water were homogeneously kneaded and dispersed to form a slurry paint having a solid content of 40%, a pH of 8.2 and an average resin particle size of 10μ. The storage stability of this paint was as excellent as that of the paint obtained in Example 15.

This paint was applied to zinc phosphate-treated steel plate, and the paint coat was preheated at 80° C. for 10 minutes and baked at 140° C. for 20 minutes. The so obtained coating having a thickness of 40μ was excellent in smoothness and finish appearance.

EXAMPLE 17

A mixture comprising 96.0 parts of the resin solution B, 5.0 parts of a reactive flow adjusting agent (compound II of the above general formula in which R is —$CH_2CH_2CH_2$— and x is 2 and which has an average molecular weight of 1050 to 1200), 19.0 parts of a blocked isocyanate resin (the above-mentioned Crelan Ue 6109), 1.0 part of dibutyl tin dilaurate (dissociation catalyst), 30.0 parts of titanium dioxide, 1.0 part of a flow modifier (the above-mentioned Baysilon PL) and 30.0 part of methylethyl ketone was homogeneously kneaded in a ball mill to form a white pint solution, and this paint solution was subjected to wet pulverization in the same manner as in Example 15 to obtain a water-containing powdery resin cake. By using this powdery resin cake, a slurry paint was prepared according to the following recipe.

Namely, 88.0 parts of the water-containing powdery resin cake (having a solid content of 57%), 0.1 part of a surface active agent (the above-mentioned Emalgen # 935), 0.2 part of a basic substance (dimethylamino ethanol), 0.8 part of a thickener (the abovementioned Acrizol ASE 60) and 23.0 parts of water were homogeneously kneaded and dispersed to obtain a white slurry paint having a solid content of 48%, a pH of 8.2 and an average resin particle size of 20μ. This slurry paint was applied to a zinc phosphate-treated iron plate, and the paint coat was pre-heated at 80° C. for 10 minutes and baked at 180° C. for 20 minutes. The resulting coating was excellent in gloss, smoothness and corrosion resistance.

EXAMPLE 18

A slurry paint having an average resin particle size of 18μ was prepared in the same manner as in Example 17 except that the reactive flow adjusting agent used in Example 17 was replaced by 5 parts of a compound II of the above general formula in which R was $-(CH_2)_5-$ and x was 2 and which had an average molecular weight of 1300 to 1500 and that no flow modifier was used. A coating prepared from this paint in the same manner as in Example 17 was excellent in smoothness.

EXAMPLE 19

A mixture comprising 100.0 parts of the resin solution D, 4.5 parts of a reactive flow adjusting agent (compound II of the above general formula in which R is —CH₂CH₂—O—CH₂CH₂— and x is 2 and which has an average molecular weight of 1500 to 1700), 0.5 part of a flow modifier (the above-mentioned Baysilon PL), 1.0 part of carbon black, 20.0 parts of methylethyl ketone and 1.0 part of dibutyl tin dilaurate was homogeneously kneaded and dispersed in a ball mill and subjected to wet pulverization to obtain a water-containing powdery resin cake. By using the so obtained powdery resin cake, a slurry paint was prepared according to the following recipe.

Namely, 83.6 parts of the water-containing powdery resin cake having a solid content of 60%, 0.1 part of a surface active agent (the above-mentioned Emalgen # 935), 0.2 part of a basic substance (triethylamine) and 0.8 part of a thickener (the above-mentioned Acrizol ASE 60) were homogeneously kneaded and dispersed to obtain a slurry paint having a solid content of 60%, a pH of 8.8 and an average resin particle size of 13μ.

The so obtained paint was excellent in storage stability and a coating formed from this paint had properties as excellent as those of the coating prepared in Example 15.

EXAMPLE 20

A homogeneous mixture comprising 40.0 parts of the resin F, 30.0 parts of a blocked isocyanate resin (the above-mentioned Crelan Ue 6109), 1.0 part of dibutyl tin dilaurate (dissociation catalyst), 7.0 parts of a reactive flow adjusting agent (compound II of above general formula in which R is $-(CH_2)_3-O-(CH_2)_3-O-(CH_2)_3-$ and x is 2 and which has an average molecular weight of 2200 to 2500), 1.0 part of a flow modifier (the above-mentioned Modaflow) and 30.0 parts of titanium dioxide was melt-kneaded by a hot roller and then pulverized by a bantam mill to obtain a powdery resin having an average particle size of 30μ. By using this powdery resin, a slurry paint was prepared according to the following recipe.

Namely, 100.0 parts of the powdery resin, 0.2 part of a surface active agent (the above-mentioned Dimol L), 1.5 parts of a thickener (the above-mentioned Acrizol ASE 60), 0.5 part of a basic substance (dimethylamino ethanol), 100.0 parts of water and 5.0 parts of ethylene glycol were homogeneously kneaded and dispersed to obtain a white slurry paint having a solid content of 50%, a pH of 8.6 and an average resin particle size of 25μ.

This paint was excellent in storage stability, and a coating prepared from this paint was excellent in smoothness and corrosion resistance.

COMPARATIVE EXAMPLE 8

A slurry paint was prepared in the same manner as in Example 17 except that the reactive flow adjusting agent used in Example 17 was replaced by the same amount of a compound II of the above general formula in which R was $-(CH_2)_5-$ and x was 2 and which had an average molecular weight of 600 to 700. Since the resin per se was sticky, at the wet pulverization step, the resin particles were coarsened because of agglomeration of the resin particles or re-cohesion of the pulverized particles, and the average particle size of the resin particles in the resulting paint was 35μ. When the resulting paint was stored under the same conditions as in Example 15, gelatinous agglomerates of the resin particles were formed, and they could not be re-dispersed by agitation by an agitator of the rotary blade type.

COMPARATIVE EXAMPLE 9

A paint was prepared in the same manner as described in Example 19 except that the reactive flow adjusting agent used in Example 19 was replaced by the same amount of compound II of the above general formula in which R was —CH₂CH₂—O—CH₂CH₂— and x was 2 and which had an average molecular weight of 2,900 to 3,200. A coating prepared from this paint in the same manner as in Example 19 was inferior to the coating prepared in Example 19 with respect to smoothness.

Results of tests made on the properties of the paints and coatings prepared in the foregoing Examples and Comparative Examples are shown in Table 3.

Table 3

| Example No. | Storage[1] Stability of Paint | Pulveriza[2] bility of Resin | Properties of Coating | | | | |
|---|---|---|---|---|---|---|---|
| | | | Smoothness[3] | Gloss[4] | Impact[5] Resistance | Erichsen[6] Value | Salt[7] Spray Resistance |
| 15 | not changed | good | good | 91 | 30 cm | 7< | ± 3 mm |
| 16 | " | " | " | 93 | 30 cm | 7< | ± 3 mm |
| 17 | " | " | " | 90 | 30 cm | 7< | ± 3 mm |
| 18 | " | " | " | 91 | 35 cm | 7< | ± 3 mm |
| 19 | " | " | " | 91 | 40 cm | 7< | ± 3 mm |
| 20 | " | " | " | 92 | 50 cm | 7< | ± 3 mm |
| Comparative Example 8 | Cohesion, gelation | difficult | " | 88 | 40 cm | 7< | ± 6 mm |
| Comparative | not | good | orange peel | 86 | 30 cm | 3 | ± 3 mm |

Table 3-continued

| Example No. | Storage[1] Stability of Paint | Pulveriza[2] bility of Resin | Properties of Coating | | | | | Salt[7] Spray Resistance |
|---|---|---|---|---|---|---|---|---|
| | | | Smoothness[3] | Gloss[4] | Impact[5] Resistance | Erichsen[6] Value | | |
| Example 9 | changed | | surface | | | | | |

Notes
[1] Same as in Table 1.
[2] Same as in Table 2.
[3] Same as in Table 1.
[4] Same as in Table 1.
[5] The measurement was conducted according to the method of JIS K-5400, 6-13-3B.
[6] Same as in Table 2.
[7] Same as in Table 2.

EXAMPLE 21

A mixture comprising 29.5 parts of titanium dioxide, 110 parts of the resin solution I, 10 parts of dodecanedicarboxylic acid (cross-linking agent), 3 parts of a bisphenol type epoxy resin (manufactured and sold under tradename "DER-664" by Dow Chemical Co. Ltd.; softening point = 95° to 105° C.), 0.5 part of a flow modifier (the above-mentioned Modaflow) and 40 parts of ethyl acetate was homogeneously kneaded and dispersed to obtain a white paint solution, and this paint solution was added to 4000 parts of water under high speed agitation to form fine dispersed liquid drops and dissolve out the solvent into water. The liquid mixture of the solvent and water was removed by filtration, and filtration and washing were repeated to obtain a water-containing powdery resin cake. By using the so obtained powdery resin cake, a slurry paint was prepared according to the following recipe.

Namely, 84 parts of the water-containing powdery resin cake (having a solid content of 60%), 0.3 part of a non-ionic surface active agent (the above-mentioned Emalgen #935), 0.6 part of a carboxyl group-containing thickener (the above-mentioned Acrizol ASE 75), 16 parts of water and 0.45 part of a 10% aqueous solution of NaOH were homogeneously kneaded and dispersed to obtain a slurry paint having a solid content of 50%, a pH of 8.1 and an average resin particle size of 25μ. Then, 100 parts of the so prepared slurry paint was diluted with 10 parts of water and spray-coated on an iron plate. Then, the coated paint was pre-heated at 80° C. for 10 minutes and baked at 160° C. for 20 minutes. The resulting coating was excellent in the smoothness. When this paint was stored in a sealed vessel at 50° C. for 1 week, neither precipitation nor cohesion of the resin particles took place.

EXAMPLE 22

A mixture comprising 100 parts of the resin solution B, 25 parts of a butylated melamine resin (the above-mentioned Melan 27), 5 parts of a novalak type epoxy resin (manufactured and sold under tradename "Epiclon N-577 by Dainippon Ink Chemical Co. Ltd.; softening point = 80° to 95° C.), 30 parts of titanium dioxide and 0.63 part of a flow modifier (the above-mentioned Modaflow) was homogeneously dispersed in a sand mill to obtain a white paint solution.

This paint solution was added to 4000 parts of water under high speed agitation and subjected to wet pulverization in the same manner as in Example 21 to obtain a water-containing powdery resin cake. By using the obtained powdery resin cake, a slurry paint was prepared according to the following recipe.

Namely, 70 parts of the water-containing powdery resin cake (having a solid content of 55%), 0.2 part of a non-ionic surface active agent (the above-mentioned Emazol 4130), 0.9 part of a carboxyl group-containing thickener (the above-mentioned Acrizol ASE 95), 0.34 part of a 10% aqueous solution of KOH and 28.5 parts by weight of water were homogeneously kneaded and dispersed to obtain a slurry paint having a solid content of 40%, a pH of 7.8 and an average resin particle size of 15μ. The so prepared slurry paint was as excellent as the slurry paint obtained in Example 21 with respect to storage stability.

The slurry paint was applied to a zinc phosphate-treated steel plate, and the paint coat was pre-heated at 80° C. for 10 minutes and baked at 140° C. for 20 minutes. The resulting coating having a thickness of 40μ was excellent in smoothness and finish appearance.

EXAMPLE 23

A mixture comprising 96 parts of the resin solution B, 5.0 parts of a bisphenol type epoxy resin (manufactured and sold under tradename "Epikote #1007" by Shell Chemical Co.; softening point = 125° to 135° C.), 19.0 parts of a blocked isocyanate resin (the above-mentioned Crelan Ue 6109), 1.0 part of dibutyl tin dilaurate (dissociation catalyst), 30.0 parts of titanium dioxide, 1.0 part of a flow modifier (the above-mentioned Baysilon PL) and 30.0 parts of methylethyl ketone was kneaded in a ball mill to form a white paint solution. In the same manner as in Example 21, the resin solution was subjected to wet pulverization to obtain a water-containing powdery resin cake. By using this powdery resin cake, a slurry paint was prepared according to the following recipe.

Namely, 88 parts of the water-containing powdery resin cake (having a solid content of 57%), 0.1 part of a surface active agent (the above-mentioned Emalgen #935), 0.5 part of a 10% aqueous solution of LiOH, 0.8 part of a thickener (the above-mentioned Acrizol ASE 60) and 23 parts of water were homogeneously kneaded and dispersed to obtain a white slurry paint having a solid content of 48%, a pH of 8.3 and an average particle size of 10μ. The so prepared slurry paint was applied to a zinc phosphate-treated iron plate, and the coated paint was pre-heated at 80° C. for 10 minutes and baked at 180° C. for 20 minutes. The resulting coating was excellent in gloss, smoothness and corrosion resistance.

EXAMPLE 24

A homogeneous mixture comprising 40 parts of the resin F, 30 parts of a blocked isocyanate resin (the above-mentioned Crelan Ue 6109), 1.0 part of dibutyl tin dilaurate (dissociation catalyst), 1.5 parts of a reactive flow adjusting agent (compound I of the above general formula in which n is 10 and which has an average molecular weight of 2200 to 2300), 6.5 parts of a bisphenol type epoxy resin (manufactured and sold under tradename "Epikote #1001" by Shell Chemical Co.; softening point = 64° to 74° C.), 1.0 part of a flow modifier (the above-mentioned Modaflow) and 30.0 parts of titanium dioxide was melt-kneaded by a hot roller and pulverized by a bantam mill to obtain a powdery resin having an average particle size of 25μ. By using the so prepared powdery resin, a slurry paint was prepared according to the following recipe.

Namely, 100 parts of the powdery resin, 0.2 part of a surface active agent (the above-mentioned Dimol N), 1.5 parts of a thickener (the above-mentioned Acrizol ASE 60), 0.7 of a 10% aqueous solution of NaOH, 100 parts of water and 5 parts of ethylene glycol were homogeneously kneaded and dispersed to obtain a white slurry paint having a solid content of 50%, a pH of 7.6 and an average resin particle size of 32μ.

This paint was excellent in the storage stability and a coating prepared from this paint was excellent in smoothness and corrosion resistance.

COMPARATIVE EXAMPLE 10

A slurry paint was prepared in the same manner as in Example 23 except that the bisphenol type epoxy resin used in Example 23 was replaced by the same amount of Araldite 6700 (manufactured and sold by Ciba Limited; softening point = 20° to 28° C.). Since the resin per se was sticky, at the wet pulverization step the resin particles were coarsened by agglomeration of the resin particles or re-cohesion of the pulverized particles, and the above particle size of the resin particles in the paint was 35μ. When the resulting paint was stored under the same conditions as in Example 23, gelatinous agglomerates of the resin particles were formed, and they could not be re-dispersed even by agitation by an agitator of the rotary blade type.

COMPARATIVE EXAMPLE 11

A slurry paint was prepared in the same manner as in Example 24 except that the amount of the bisphenol type epoxy resin was changed to 16.6 parts. A coating prepared from the so prepared paint in the same manner as in Example 24 was inferior to the coating obtained in Example 24 with respect to flexibility.

COMPARATIVE EXAMPLE 12

A slurry paint was prepared in the same manner as in Example 23 except that the bisphenol type epoxy resin used in Example 23 was replaced by the same amount of Epikote #1009 (manufactured and sold by Shell Chemical Co.; softening point = 155° to 165° C.). A coating prepared from this paint in the same manner as in Example 23 was inferior to the coating prepared in Example 23 with respect to smoothness.

Results of the tests made on properties of paints and coatings prepared in the foregoing Examples and Comparative Examples are shown in Table 4.

| Example No. | Stability[1] of Paint | Pulveriza-[2] bility of Resin | Properties of Coating | | | | |
|---|---|---|---|---|---|---|---|
| | | | Smoothness[3] | Gloss[4] | Impact[5] Resistance | Erichsen[6] Value | Storage[4] Salt[7] Spray Resistance |
| 21 | not changed | good | good | 91 | 30 cm | 7< | ± 1 mm |
| 22 | " | " | " | 93 | 30 cm | 7< | ± 1 mm |
| 23 | " | " | " | 87 | 30 cm | 7< | ± 1 mm |
| 24 | " | " | " | 92 | 50 cm | 7< | ± 1 mm |
| Comparative Example 10 | cohesion, gelation | difficult | " | 87 | 50 cm | 7< | ± 3 mm |
| Comparative Example 11 | not changed | good | good | 73 | 10 cm | 1 | ± 1 mm |
| Comparative Example 12 | " | " | orange peel surface | 69 | 30 cm | 4 | ± 2 mm |

Notes
[1]Same as in Table 1.
[2]Same as in Table 2.
[3]Same as in Table 1.
[4]Same as in Table 1.
[5]Same as in Table 3.
[6]Same as in Table 2.
[7]Same as in Table 2.

What is claimed is:

1. An aqueous dispersion type thermosetting coating composition comprising
   (A) 100 parts by weight of a thermosetting resin powder having an average particle size of 5 to 50μ comprising
      (i) the thermosetting resin having an acid value of 5 to 30,
      (ii) a crosslinking agent,
      (iii) 1 to 8% by weight based on the thermosetting resin of at least one reactive flow adjusting agent selected from the group consisting of
      (I) compounds having an average molecular weight of 1,000 to 2,500 and represented by the following general formula:

HO—[(CH$_2$)$_n$—O]$_m$—H wherein $n$ is an integer of from 2 to 40 and $m$ is an integer of from 2 to 55, and (II)

R—[(O—CH$_2$—CH$_2$—CH$_2$—CH$_2$—CH$_2$)$_x$OH]$_y$ wherein $x$ is an integer of from 2 to 10, $y$ is an integer of from 2 to 4, and R stands for an aliphatic polyhydric alcohol residue, cyclic aliphatic polyhydric alcohol residue or aromatic polyhydric alcohol residue having 2 to 16 carbon atoms, and
      (iv) a pigment,
   (B) 60 to 200 parts by weight based on the thermosetting resin (A) of water,
   (C) 0.1 to 0.5 parts by weight based on the thermosetting resin (A) of a carboxyl group-containing organic polymeric thickener having an acid value of 200 to 500, and
   (D) at least one member selected from the group consisting of organic amines having a boiling point higher than 100° C. and alkali metal hydroxide, the pH of the composition being in the range of from 7.5 to 9.0.

2. An aqueous dispersion type thermosetting coating composition as set forth in claim 1 wherein the thermosetting resin is a combination of an acrylic resin and a cross-linking agent.

3. An aqueous dispersion type thermosetting coating composition as set forth in claim 1 wherein the thermosetting resin is a combination of a polyester resin and a cross-linking agent.

4. An aqueous dispersion type thermosetting coating composition as set forth in claim 2 wherein the cross-linking agent is at least one member selected from the group consisting of alkyl-etherified amino resins and blocked isocyanate compounds.

5. An aqueous dispersion type thermosetting coating composition as set forth in claim 3 wherein the cross-linking agent is at least one member selected from the group consisting of alkyl-etherified amino resins and blocked isocyanate compounds.

6. An aqueous dispersion type thermosetting coating composition as set forth in claim 2 wherein the acrylic resin has a hydroxyl value of 20 to 120 and a weight average molecular weight of 3000 to 35000, the cross-linking agent is a block isocyanate compound, and the acrylic resin/blocked isocyanate compound weight ratio is in the range of from 100/5 to 100/100.

7. An aqueous dispersion type thermosetting coating composition as set forth in claim 2 wherein the acrylic resin has a hydroxyl value of 0.05 to 100 and a weight average molecular weight of 3000 to 35000, the cross-linking agent is an alkyl-etherified amino resin, and the acrylic resin/alkyl-etherified amino resin weight ratio is in the range of from 100/10 to 100/100.

8. An aqueous dispersion type thermosetting coating composition as set forth in claim 3 wherein the polyester resin has a hydroxyl value of 30 to 100 and a softening point of 25° to 120° C., the cross-linking agent is a blocked isocyanate compound having an isocyanate equivalent of 100 to 2000, and the mixing ratio of the polyester resin and the blocked isocyanate compound is such that the ratio of the number of isocyanate groups to the number of hydroxyl groups is in the range of from 0.3 to 1.5.

9. An aqueous dispersion type thermosetting coating composition as set forth in claim 3 wherein the polyester resin has a hydroxyl value of 0.05 to 100 and a softening point of 25° to 120° C., the cross-linking agent is an alkyl-etherified amine resin, and the polyester resin/alkyl-etherified amino resin weight ratio is in the range of from 100/10 to 100/100.

10. An aqueous dispersion type thermosetting coating composition as set forth in claim 2 wherein the acrylic resin contains in the molecule 0.5 to 30% by weight of glycidyl group-containing $\alpha,\beta$-ethenically unsaturated monomer segments, the cross-linking agent is a polybasic carboxylic acid, and the acrylic resin/polybasic carboxylic acid weight ratio is in the range of from 100/3 to 100/30.

11. An aqueous dispersion type thermosetting coating composition as set forth in claim 1 wherein the thermosetting resin is a thermosetting resin composition containing 1 to 13% by weight of an epoxy resin having in the molecule at least one aromatic ring.

* * * * *